Patented Aug. 3, 1943

2,325,669

UNITED STATES PATENT OFFICE 2,325,669

LAMINATED WOOD PRODUCT

Camille Dreyfus, New York, N. Y.

No Drawing. Application November 9, 1940,
Serial No. 365,042

3 Claims. (Cl. 154—45.9)

This invention relates to laminated wood products for use in making furniture and for other technical and commercial purposes.

An object of my invention is to produce laminated products for use in making furniture and for other technical and commercial purposes where sheets of wood are laminated or composited with a sheet or layer of appreciable thickness of a plastic material, particularly of an organic plastic material.

Other objects of my invention will appear from the following detailed description.

I have found that if sheets of wood are laminated or composited with a sheet or layer of appreciable thickness of plastic material particularly of organic nature, the resulting composite material is of greater strength than that of a sheet of wood of the same or greater weight. As a result this composite or laminated product may be employed to make chairs, tables, desks, beds, cabinets, bookcases or other furniture, or other articles for industrial and technical uses, which are lighter in construction and more desirable than those made entirely of wood.

According to my invention, then composite material is made by laminating one or more sheets or layers of wood with one or more sheets or layers of appreciable thickness of plastic material particularly of organic nature, and the resulting product is used in the making of furniture or other articles of commercial, industrial or technical use.

While I prefer to use cellulose acetate as the plastic material, and the invention will be specifically described in connection therewith, other materials may be used, such as cellulose acetopropionate, cellulose aceto-butyrate and cellulose aceto-stearate. However, this invention is applicable to a large range of other plastic organic or inorganic substances, such as, for example, other thermoplastic cellulose derivatives, e. g. cellulose propionate, butyrate, stearate and propio-stearate, cellulose ethers such as ethyl cellulose and benzyl cellulose, and ether-esters of cellulose such as ethyl cellulose acetate and oxy-ethyl cellulose acetate, nitrocellulose, polyvinyl esters and ethers, e. g. polyvinyl acetate, polyvinyl chloride, polyvinyl-chlor-acetate and co-polymers of vinyl acetate and vinyl chloride, polymerized esters of unsaturated acids, e. g. those of the acrylic and methacrylic acid series, fibre- or film-forming polyamides, e. g. the products obtained by condensation of diamines with dicarboxylic or disulphonic acids or by self-condensation of amino-carboxylic or amino-sulphonic acids, and other plastic polymers obtainable by condensation of bi-functional reagents.

In case of organic plastic materials that have sufficient softness, no plasticizer or softeners need be added. With other materials, substances such as plasticizers in amounts to render the material softer, reducible to liquid or more plastic are preferably employed. Examples of plasticizers for cellulose acetate and like materials are triacetin, triphenyl acetin, tripropionin, dimethyl phthalate, diethyl phthalate, dimethoxy ethyl phthalate, dibutyl tartrate and the sulphonamides, such as p-toluene sulphonamide. These plasticizers may be used in amounts of less than 30 to 85% or more of the weight of the cellulose acetate.

When used, the plasticizers are preferably distributed throughout the cellulose acetate in as uniform a manner as possible. This may be effected by treating the cellulose acetate with a solution or dispersion of the plasticizer in water, benzene, ether or other non-solvent for cellulose acetate, allowing the cellulose acetate to absorb the plasticizer from the solution or dispersion and removing the solvent by evaporation as described in U. S. Patent No. 1,999,405. Another method by which the agents may be uniformly distributed comprises treating the cellulose acetate with a solution or dispersion of the agents in a volatile solvent for the cellulose acetate or by adding the agents to a solution of the cellulose acetate in a volatile solvent. In the former case the materials are worked, e. g. by malaxation, until the substance is dissolved. When a uniform solution and/or dispersion of the components has been obtained, the volatile solvent may be evaporated, either wholly or in part, so as to leave the required composition. The material so formed may be worked under heat and pressure to form homogeneous masses which may then be molded, rolled, or cut into sheets of the required thickness and size.

As the wood sheet component of the laminated product, any suitable hard or soft wood, such as mahogany, walnut, oak, maple, pine, spruce, etc., may be used depending on the decorative or other effect desired.

As stated the thickness of the plastic sheet employed is appreciable as its presence is desired for imparting strength as is considerably greater than that required merely to cement the layers or sheets of wood together. The thickness of the plastic layer employed may range from less than 0.1 to 2 inches or more. The thickness of the wood may vary from that of thin veneer to that of boards, say from less than 0.015 to 1 inch or more. Generally, the total thickness of the plastic sheets or layers present will be greater, say from two to ten times greater, than that of the wood in order to attain greater strength and durability.

The laminated sheet material in accordance with this invention may be made of one or more wood sheets and one or more plastic sheets, the simplest form being composed of one wood sheet and one organic plastic sheet. However, more complex combinations may be employed, for instance, two, three or more wood sheets alternating with one, two, three or more plastic sheets. The exposed side may be either of wood if a wood surface is desired or of the plastic material which may be transparent to show the wood effect or which may be of any decorative effect such as pearl, mottled, or any of the decorative effects attainable with plastics.

In making the laminated or composite sheet material, the organic plastic sheets may be caused to adhere to the wood sheets by any suitable expedients such as by applying heat and pressure with or without adhesives such as polyvinyl acetate.

It is to be understood that the foregoing detailed description is merely given by way of illustration and that many variations may be made therein without departing from the spirit of my invention.

Having described my invention, what I desire to secure by Letters Patent is:

1. A composite material for use in the manufacture of furniture and the like comprising at least one layer of wood laminated with at least one layer of an organic plastic material of a thickness of 0.1 to 2 inches, the thickness of the plastic material being greater than that of the wood.

2. A composite material for use in the manufacture of furniture and the like comprising at least one layer of wood laminated with at least one layer of a plastic material of a thickness of 0.1 to 2 inches comprising a derivative of cellulose, the thickness of the plastic material being greater than that of the wood.

3. A composite material for use in the manufacture of furniture and the like comprising at least one layer of wood laminated with at least one layer of a plastic material of a thickness of 0.1 to 2 inches comprising cellulose acetate, the thickness of the plastic material being greater than that of the wood.

CAMILLE DREYFUS.